United States Patent
Jain et al.

(10) Patent No.: US 11,270,329 B2
(45) Date of Patent: Mar. 8, 2022

(54) SYSTEM AND METHOD FOR PROVIDING RELEVANT ELECTRONIC OFFERS IN A MOBILE BANKING APPLICATION

(71) Applicant: JPMorgan Chase Bank, N.A., New York, NY (US)

(72) Inventors: Roopal Jain, Bear, DE (US); Boda Sarath Rao, Chadds Ford, PA (US); Pethaperumal Narayanasamy, Baer, DE (US); Andrew Deinert, Lincoln, DE (US); Getnet Bayou, Washington, DC (US); Sutanu Chaudhuri, Glenn Mills, PA (US); Ilayanambi Sarangapani, Garnet Valley, PA (US); Sheela Colluray, Exton, PA (US); Amit Sharma, Chadds Ford, PA (US); Lauren Kuhne, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 173 days.

(21) Appl. No.: 16/193,212

(22) Filed: Nov. 16, 2018

(65) Prior Publication Data

US 2019/0147482 A1 May 16, 2019

Related U.S. Application Data

(60) Provisional application No. 62/587,128, filed on Nov. 16, 2017.

(51) Int. Cl.
*G06Q 30/02* (2012.01)
*G06Q 20/32* (2012.01)
*H04W 4/02* (2018.01)

(52) U.S. Cl.
CPC ....... *G06Q 30/0235* (2013.01); *G06Q 20/322* (2013.01); *G06Q 30/0239* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 2008/0243815 | A1* | 10/2008 | Chan | G06Q 30/0641 |
| 2012/0239483 | A1* | 9/2012 | Yankovich | H04W 4/029 |
| | | | | 705/14.35 |
| 2012/0323725 | A1* | 12/2012 | Johnston | G06Q 30/02 |
| | | | | 705/26.7 |
| 2013/0191213 | A1* | 7/2013 | Beck | G06Q 20/3224 |
| | | | | 705/14.53 |
| 2014/0164119 | A1* | 6/2014 | Narayanan | G06Q 20/34 |
| | | | | 705/14.58 |
| 2014/0344270 | A1* | 11/2014 | Lambert | G06Q 10/067 |
| | | | | 707/737 |

(Continued)

*Primary Examiner* — Bion A Shelden
(74) *Attorney, Agent, or Firm* — Hunton Andrews Kurth LLP (57) ABSTRACT

The invention relates to electronic offers in a mobile banking application. An embodiment of the present invention is directed to a system that provides relevant offers for customized deals to a customer responsive to a current customer transaction, current location and/or other profile information. The relevant offer may be available for a limited time. The customer's response (e.g., save, redeem, skip, ignore, etc.) may then be used for more relevant offers in the future.

15 Claims, 7 Drawing Sheets

(56) References Cited

U.S. PATENT DOCUMENTS

| | | | |
|---|---|---|---|
| 2014/0351033 A1* | 11/2014 | Azevedo | G06F 16/248 705/14.19 |
| 2017/0061481 A1* | 3/2017 | Wee | G06Q 30/0201 |
| 2017/0352051 A1* | 12/2017 | Watkins | G06Q 30/0224 |
| 2018/0005260 A1* | 1/2018 | Loomis | G06Q 20/3224 |
| 2018/0247296 A1* | 8/2018 | Win | G06Q 30/0207 |
| 2018/0357591 A1* | 12/2018 | Bell | G06Q 30/0261 |
| 2018/0375960 A1* | 12/2018 | Greene | H04L 67/20 |
| 2019/0147469 A1* | 5/2019 | Hu | G06Q 30/0205 705/7.34 |

* cited by examiner

SYSTEM AND METHOD FOR PROVIDING RELEVANT ELECTRONIC OFFERS IN A MOBILE BANKING APPLICATION

CROSS REFERENCE TO RELATED APPLICATIONS

This application claims priority to U.S. Provisional Application 62/587,128, filed Nov. 16, 2017, the contents of which are incorporated herein in its entirety.

FIELD OF THE INVENTION

The invention relates generally to a system and method for generating and presenting relevant electronic offers with time expiration to customers based on a current transaction and customer's other activities which may be location-based and/or time-based.

BACKGROUND OF THE INVENTION

Currently, there is inconsistent usage of mobile banking applications by customers as well as an inconsistent presentation of offers sent to these customers. Additionally, the offers presented do not directly compliment or effectively drive business back to a particular banking entity hosting the banking mobile application. As a result, customers do not engage with current offers while merchants lose opportunities and sales.

These and other drawbacks exist.

SUMMARY OF THE INVENTION

According to one embodiment, the invention relates to a system that generates relevant and/or customized electronic offers. The system comprises: a memory component and a recommendation engine comprising a computer processor, the recommendation engine coupled to the memory component and configured to: receive a request to initiate an electronic transaction from a mobile device associated with a customer; determine a location of the mobile device that initiated the electronic transaction; identify one or more merchants within a predetermined distance from the determined location of the mobile device; identify one or more electronic offers for the identified one or more merchants based on one or more characteristics associated with the customer of the mobile device; transmit the identified one or more electronic offers to the mobile device that initiated the financial transaction; the one or more electronic offers comprises a time expiration to claim the offer; and receive a customer action responsive to the received one or more electronic offers.

According to an embodiment of the present invention, a method provides an electronic offer in a mobile banking application implemented by one or more banking application server devices. The method comprises the steps of: receiving, via a mobile application executing on a mobile device, a request to initiate an electronic transaction from the mobile device associated with a customer; determining, via a computer processor, a location of the mobile device that initiated the electronic transaction; identifying, via a recommendation engine, one or more merchants within a predetermined distance from the determined location of the mobile device; identifying, via the recommendation engine, one or more electronic offers for the identified one or more merchants based on one or more characteristics associated with the customer of the mobile device; transmitting, via an electronic communication network, the identified one or more electronic offers to the mobile device that initiated the financial transaction; the one or more electronic offers comprises a time expiration to claim the offer; and receiving a customer action responsive to the received one or more electronic offers.

The system may include a specially programmed computer system comprising one or more computer processors, interactive interfaces, electronic storage devices, and networks.

The computer implemented system, method and medium described herein provide unique advantages to customers, merchants and/or other participants, according to various embodiments of the invention. An embodiment of the present invention learns from purchase patterns and provides a more relevant and/or customized offer to customers. The relevant and/or customized offers have a time expiration to encourage customers to act on the offers. The customer's response may then be used to refine future offers. Coupled with a mobile wallet application and online transactions, an embodiment of the present invention provides a path-breaking system for merchant-to-merchant, product-to-product, cross Lines of Business and multi-platform promotions, thus improving the overall digital marketing experience and enhancing brand recognition and customer loyalty. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a system that provides relevant and/or customized offers to a customer responsive to a current customer transaction, current location and/or other profile information. The customized offer may be available for a limited time. The customer's response (e.g., save, redeem, skip, ignore, etc.) may then be used for future offers and/or notifications.

Based on a customer making a transaction with a certain payment mechanism, an embodiment of the present invention may generate and send targeted mobile notifications to the customer from a corresponding application executing on the customer's mobile device. The notifications may be tied to specific offers for the customer that may be attainable if the customer interacts (e.g., actions, clicks, taps, swipe, etc.) with the specific notification that came from the relevant transaction. Upon selecting the notification, the customer may be presented with relevant offer for a specific time period (e.g., 30 minutes, one hour, end of day, etc.) when the specific reward/deal is available for the customer.

An embodiment of the present invention may be tied to a digital mobile application notification settings, preferences and/or participation directly to offers sent to customers. With the innovative system, customers may be notified of rewards/deals through specific, targeted and timely notifications. The innovative system and method moves customers from fixed promotions to personalized promotions.

Figure 1:
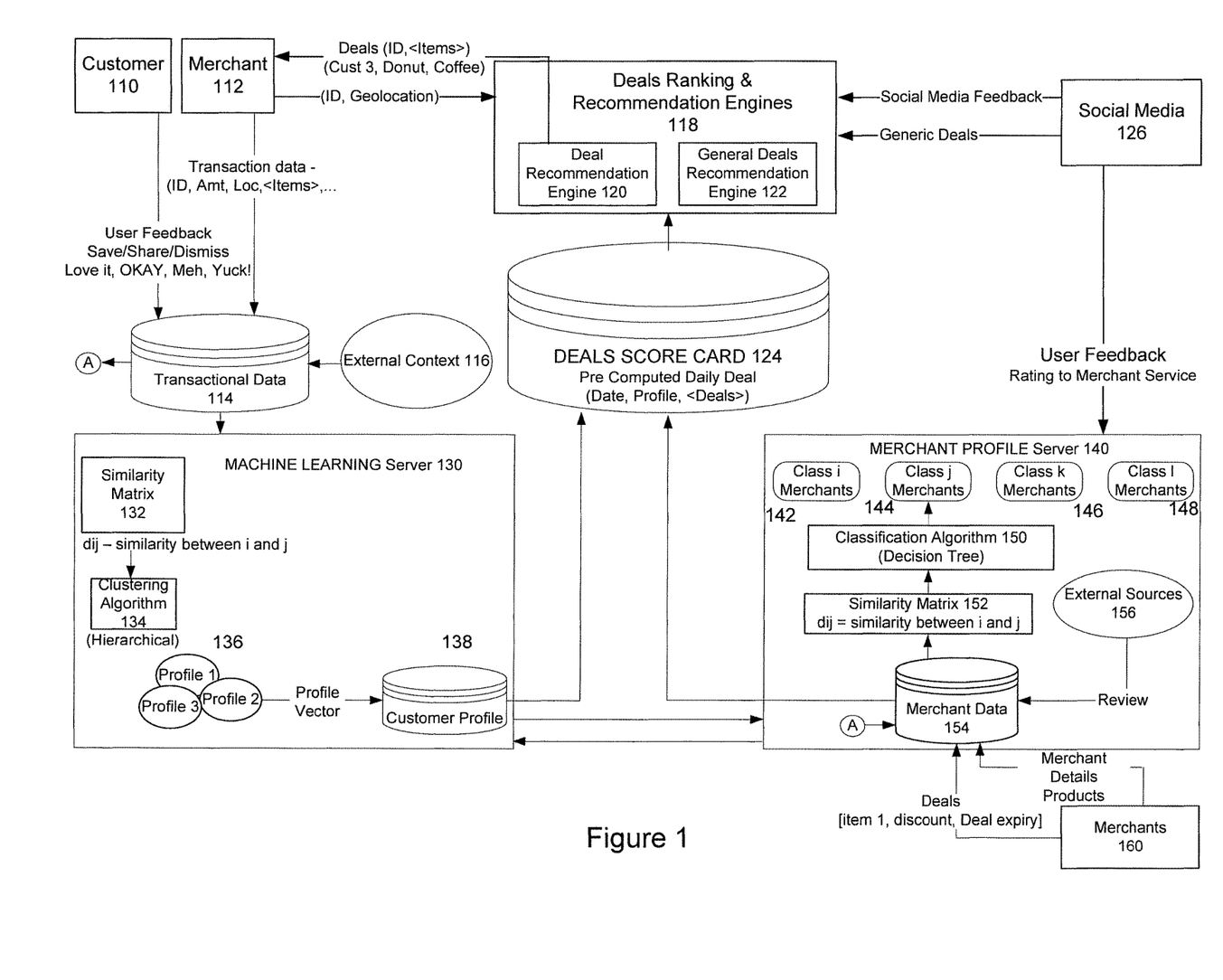
FIG. 1 illustrates a schematic diagram of a system that provides relevant and time-limited offers, according to an exemplary embodiment.

FIG. 1 illustrates a schematic diagram of a system that provides relevant and time-limited offers, according to an exemplary embodiment. As illustrated in FIG. 1, the system may capture customer feedback from Customers 110, transaction data from Merchants 112 and external context data from various sources represented by 116. Customer feedback may include feedback relating to previous offers (e.g., save, share, dismiss, loved it, etc.). Transaction data from Merchant 112 may include merchant identifier, amount, location, line items, etc. External context data may include data relating to season, events, weather, global news, etc. The data may be stored at Transaction Database 114.

Transaction data may then be fed into Machine Learning Server 130. Machine Learning Server 130 may apply a Similarity Matrix 132 to identify similarities between transaction data metrics. Clustering Algorithm 134 may identify profiles represented by Profile 1, Profile 2, Profile 3, etc. Profiles may represent a group of customers that share similarities, commonalities, etc. Profiles may then be used to generate a Profile Vector and forwarded to Customer Profile Database 138. Customer profile data may include spending patterns, customer preferences, demographic data, household information, etc.

Merchant 112 may communicate with Recommendation Engine 118. For example, Merchant 112 may provide merchant identifier, geolocation, etc. Recommendation Engine 118 may include Deal Recommendation Engine 120 and General Deals recommendation Engine 122. As shown in FIG. 1, recommendation deals may be provided via 120 and general deals may be provided via 122. In this example, a deal may be generated and provided to Merchant 112.

Social Media 126 may represent customer's activities on various networking providers. Deals from General Deals Recommendation Engine 122 may be provided via Social Media 126. Social Media feedback may be received by Engine 118. Social Media 126 may also identify user feedback. This may include interactions that involve a specific merchant or merchant product or service. This information may be transmitted to Merchant Profile 140.

Merchant Profile Server 140 may include Merchant Database 154. Merchant data may be received from Merchants 160 and may include deals (e.g., item identifier, discount, deal expiry, etc.) as well as merchant details and products. Merchant Database 154 may also receive data from Transaction Database 114 and External Sources 156. Transaction Database may include user feedback and transaction data. External Sources 156 may include merchant reviews from third party providers. Similarity Matrix 152 may be applied to merchant data from Merchant Database 154. Clustering Algorithm 150 may be applied to generate classes of Merchants, represented by 142, 144, 146, and 148.

Customer Profile data and Merchant Data may be received by a Deals Score Card 124, which then provides data to Deals Ranking and Recommendation Engine 118. Deals Ranking and Recommendation Engine 118 may then generate specific, timely and time-sensitive deals to customers via various forms of communication including mobile device, social media, email communication, etc.

An embodiment of the present invention recognizes that location is becoming increasingly critical for marketing. In addition, customers are willing to share where, when and what they are doing in exchange for incentives. An embodiment of the present invention is directed to providing customers with local deals relevant to them. The deals may be provided via offers that may be transaction-triggered, location-based and come with an expiry. The deals offered may be saved, skipped and shared on social media.

For example, an embodiment of the present invention may track a customer's transactions (e.g., where the customer is making purchases, what the customer is purchasing, when is the purchase occurring, etc.) and use that information to identify relevant products and services. When the customer makes a transaction in a particular location (e.g., merchant store, etc.), an embodiment of the present invention may identify relevant offers based on the customer's purchase history, profile information, time relevance, etc. The offer may have a corresponding expiration (e.g., short flash deal) to further attract the customer to a limited incentive/reward/deal. In addition, an embodiment of the present invention may also consider time-based activity, including transaction patterns, person's preferred time of purchase, merchant's best time to extend offer, etc.

According to an exemplary illustration, a customer may be at a shopping mall. The customer may be identified by a recent transaction in the mall or other indication that the customer is located in the mall or area. For example, an embodiment of the present invention may detect that the customer purchased a coffee in the mall, made an ATM transaction and/or performed other interaction (e.g., entered a parking garage, check-in at a location, etc.). An embodiment of the present invention may present an offer that is valid for hour for a pizza deal in a restaurant located in the mall (or close-by). The offer itself may have an expiry, which may be represented in a screen or interface of a mobile device. In this example, the customer has one hour to claim the offer by saving the deal. When the customer saves the deal, the deal may be valid for a longer period of time, e.g., 2 days, one week, one month, every weekend this month, etc. Because the customer has purchased at the restaurant or made similar purchases at other restaurants, the customer is more likely to save the deal. According to another example, the customer may receive a notification for a deal for other items, such as a television or other electronics. Because these purchases are above a threshold, these notifications may have a longer expiration to claim the deal (e.g., end of the day).

Figure 2:
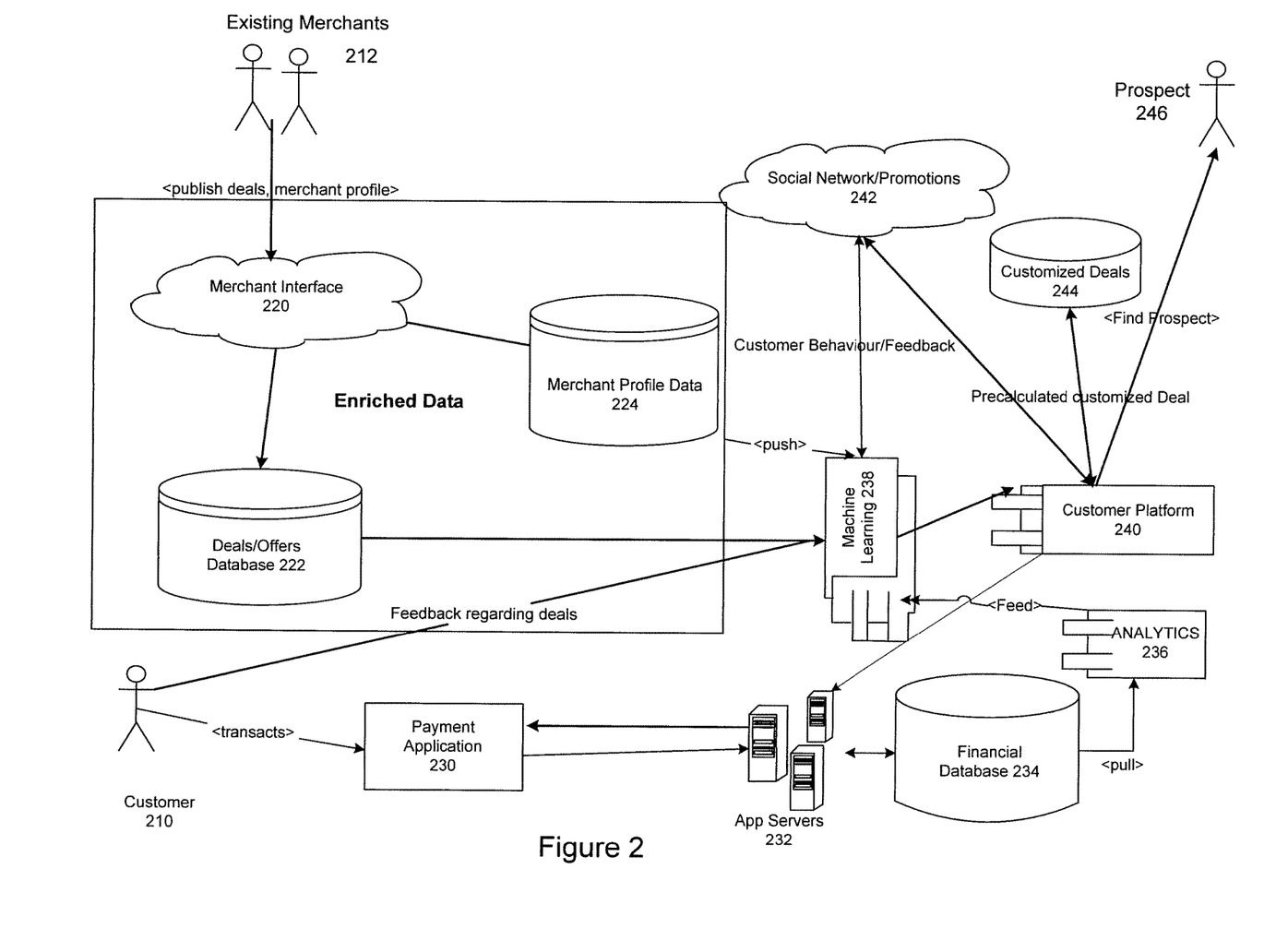
FIG. 2 illustrates another representative of a system that provides relevant and time-limited offers, according to an exemplary embodiment.

FIG. 2 illustrates another representative of a system that provides relevant and time-limited offers, according to an exemplary embodiment. An embodiment of the present invention is directed to providing evaporative deals to customers based on their location and purchase pattern. An embodiment of the present invention is directed to building a model where deals find customer vis-à-vis customer finding deals. This solution further promotes small business partners and increases transactions.

As shown in FIG. 2, Customer 210 may interact with a payment application 230 via a mobile device. The transaction may be processed via App Servers 232 that access Financial Database 234. Data from Financial Database 234 may be applied to Analytics 236.

Merchants 212 may provide deals and manage merchant profiles via Merchant Interface 220. Merchant Interface 220 may communicate with Deals/Offers Database 222 and Merchant Profile 224. Deals data and Merchant profile data may then be applied to a Machine Learning system 238. Machine Learning system 238 may also receive customer feedback data regarding deals and/or other events, feed from analytics 236 as well as social network/promotions data from 242. Machine Learning system 238 may then provide information to a customer platform 240 that manages customer buying patterns. Customer Platform 240 may further communicate with Social Network/Promotions 242, Customized Deals 244, etc. Customer Platform 240 may further communicate deals and offers to prospective customers represented by 246.

As illustrated in FIGS. 1 and 2, communication networks may be communicatively coupled with one or more data devices including, for example, computing devices associated with end users, such as customers, merchants, etc. Computing devices may include computers, laptops, workstations, kiosks, terminals, tablets, mobile devices, mobile phones, smart devices, a personal digital assistant, a smartphone, a smartwatch, smart glasses, other wearables or other computing devices capable of sending or receiving network signals. As shown in FIGS. 1 and 2, computing components, servers, processors may be communicatively coupled to various data storage devices.

Storage components may include any suitable data structure to maintain the information and allow access and retrieval of the information. For example, the storage components may keep the data in an organized fashion and may be any type of database as may be known in the art to store and organize data as described herein. The storage may be local, remote, or a combination. The storage components may have back-up capability built-in. Communications with the storage components may be over a network or communications may involve a direct connection between the various storage components, as depicted in FIG. 1. The storage components may also represent cloud or other network based storage.

The systems of FIGS. 1 and 2 may be implemented in a variety of ways. Architecture within the system may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within the system may be located on a single device or distributed across a plurality of devices including one or more centralized servers and one or more mobile units or end user devices. The architecture depicted in the system is meant to be exemplary and non-limiting. For example, while connections and relationships between the elements of the system is depicted, it should be appreciated that other connections and relationships are possible. The system described below may be used to implement the various methods herein, by way of example. Various elements of the system may be referenced in explaining the exemplary methods described herein.

Communication networks may be a wireless network, a wired network or any combination of wireless network and wired network. Networks may support an Internet network, a wireless communication network, a cellular network, Bluetooth, or the like, or any combination thereof. Although the exemplary networks may be depicted as one network for simplicity, it should be appreciated that according to one or more embodiments, networks may comprise a plurality of interconnected networks, such as, for example, a service provider network, the Internet, a cellular network, corporate networks, or even home networks, or any of the types of networks mentioned above. Data may be transmitted and received via communication networks utilizing a standard networking protocol or a standard telecommunications protocol.

While FIGS. 1 and 2 illustrate individual devices or components, it should be appreciated that there may be several of such devices to carry out the various exemplary embodiments.

Figure 3:
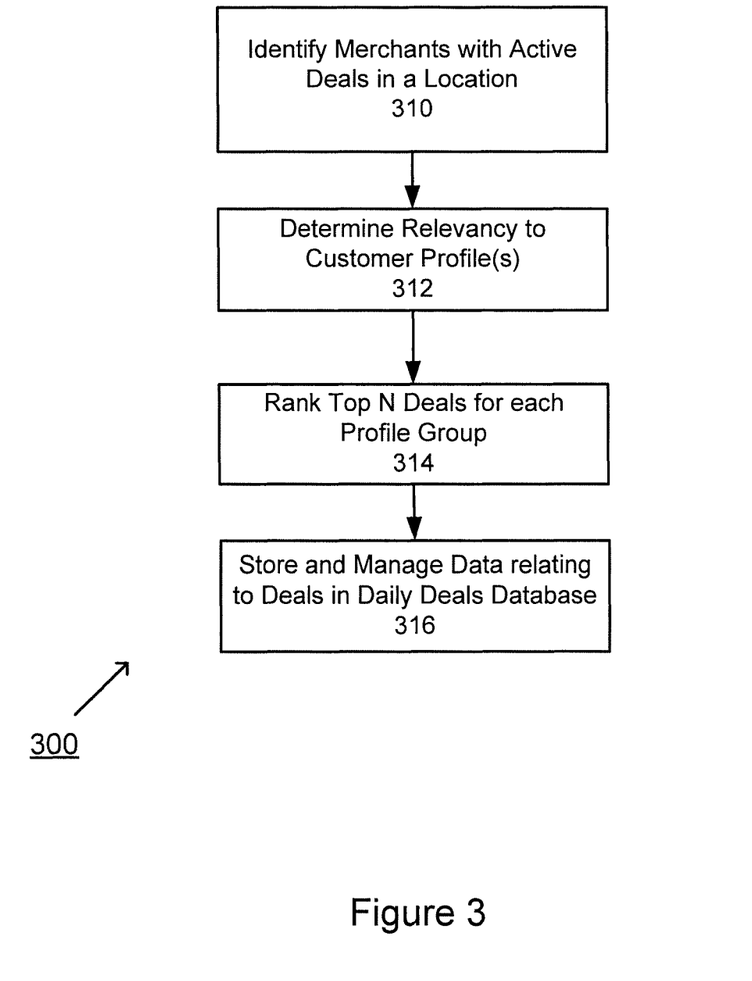
FIG. 3 is an exemplary flow diagram for providing relevant and time-limited offers, according to an embodiment of the present invention.

FIG. 3 is an exemplary flow diagram for providing customized and time-limited offers, according to an embodiment of the present invention. At step 310, for each predetermined area or location, one or more merchants with active deals may be identified. At step 312, an embodiment of the present invention may determine a relevancy of the deals to a customer profile or a customer profile group. At step 314, an embodiment of the present invention may rank a top number of deals for each customer profile or customer profile group. At step 316, the deals may be stored in a daily deals database or other storage. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Each step is described in further detail below.

At step 310, for each predetermined area or location, one or more merchants with active deals may be identified. For example, a banking application server device may determine a location of the one of the mobile client devices based on information in a received request to initiate the electronic financial transaction.

At step 312, an embodiment of the present invention may determine a relevancy of the deals to customer profiles. The relevancy may be based on various customer related factors, e.g., spending pattern, profile information, preference, time, etc. According to an exemplary scenario, relevancy may be based on a customer's profile and whether a deal or offer matches.

For example, the customer may purchase a baby gift for a family member. An embodiment of the present invention may recognize this purchase as an outlier purchase and thereby not send deal or offers that are related. In this example, an embodiment of the present invention may recognize that the baby gift purchase does not fit the customer's current profile. According to another example, an embodiment of the present invention may learn from a customer's activities and transaction and determine whether the customer's profile should be updated.

At step 314, an embodiment of the present invention may rank a top number of deals for each profile group. An embodiment of the present invention may determine top deals based on customer feedback, redemption rate, customer reviews, amount of discount, etc. The top ranked deals may then be further tailored and customized for a particular customer or customer group. For example, a top pizza deal may be identified. The top pizza deal may be further customized to a particular customer when the customer is located in a relevant area. For example, an embodiment of the present invention may recognize that the customer favors a particular style or type of pizza and thereby customize the offer accordingly. Accordingly, various factors including location and time based activity may be used to rank deals. Other variations and enhancements may be applied.

At step 316, the deals may be stored in a daily deals database. Other storage mechanisms may be applied, including local, remote, cloud-based, distributed, etc.

Figure 4:
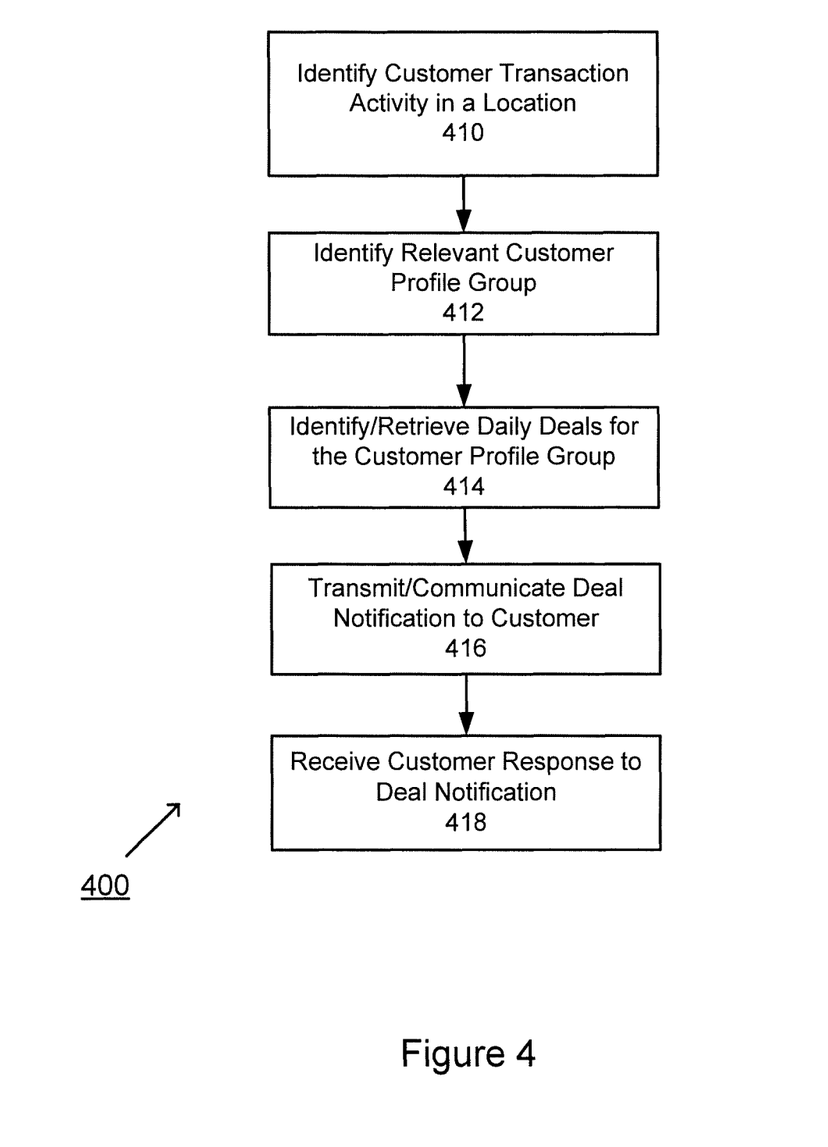
FIG. 4 is an exemplary flow diagram for providing relevant and time-limited offers, according to an embodiment of the present invention.

FIG. 4 is an exemplary flow diagram for providing customized and time-limited offers, according to an embodiment of the present invention. At step 410, a customer transaction occurring in a predetermined area or location may be identified. At step 412, an embodiment of the present invention may identify a relevant customer profile group. At step 414, a daily deal for the customer profile group may be identified. At step 416, a deal notification may be communicated to the customer. At step 418, a customer response to the deal notification may be received or otherwise determined. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Each step is discussed in further detail below. Each step is described in further detail below.

At step 410, a customer transaction occurring in a predetermined area or location may be identified. The customer may make a purchase or otherwise make an interaction that identifies the customer in a particular location. For example, the customer may interact with an ATM device. According to another example, the customer may make an inquiry at a merchant location. Other location identification services may be applied, including geo-location services.

At step 412, an embodiment of the present invention may identify one or more relevant customer profile group. This may be based on location, spending pattern, profile information, etc.

At step 414, a daily deal for the customer profile group may be identified. For example, an embodiment of the present invention may identify one or more offers or deals in a deals database for the identified one or more merchants based on one or more characteristics associated with the customer. This may include prior purchases, behavior, age, gender, income and/or other demographic and related data, for example. A machine learning algorithm may also be executed to obtain data, such as data from the social network database related to one or more of the mobile client devices within an area and/or feedback data received from one or more of the mobile client devices to obtain relevant offers or deals from one or more merchants that are stored in the deals database.

In another example, if there are multiple customers within a particular area initiating electronic transactions, an embodiment of the present invention may first determine if a number of customers on mobile client devices in A<=Num_Customers threshold. If the number of operators or customers on mobile client devices in A is less than or equal to a stored threshold, one or more offers or deals may be identified based on one or more characteristics, such as prior purchasing behavior age, gender, and/or income data by way of example only, associated with the customer that initiated the electronic financial transaction.

According to another example, if a number of operators or customers on mobile computing devices in A>Num_Customers threshold, an embodiment of the present invention may cluster the operators or customers in A to n clusters ($C_1, C_2, \ldots, C_n$). An embodiment of the present invention may then identify a customer at the center of each cluster—RepCust$C_i$, An embodiment of the present invention may identify one or more characteristics, such as age, gender, income, and/or prior purchasing behavior data, of customer RepCust$C_i$. An embodiment of the present invention may identify and rank offers or deals in the deals database based on one or more characteristics, such as prior purchasing behavior age, gender, and/or income data by way of example only, associated with the operator or customer RepCust$C_i$, in the center of each cluster.

At step 416, a deal notification may be communicated to the customer. Additional customizations may be added to the deal and/or deal notification. This may include more or less restrictions. The ability to fine-tune the deal to a specific customer may be implemented.

For example, offers or deals may be based on one or more characteristics of the customer that initiated the electronic financial transaction or in another example based on a representative operator or customer RepCust$C_i$ in the center of cluster which also contains the one of the mobile client devices that initiated the financial transaction.

For example, each of the offers may have a time limit to accept before the offer ends or deal evaporates. Additionally, the customer may respond to the offer. This may include responses such as save, share, skip, and/or provide feedback on any of the offers.

At step 418, a customer response to the deal notification may be received or otherwise determined. For example, the customer may save, skip and/or otherwise act on the deal notification. The customer may further redeem the deal associated with the deal notification. Additional metrics may be collected, e.g., how quickly did the customer save the deal, when/where did the customer redeem, etc.

Figure 5A:
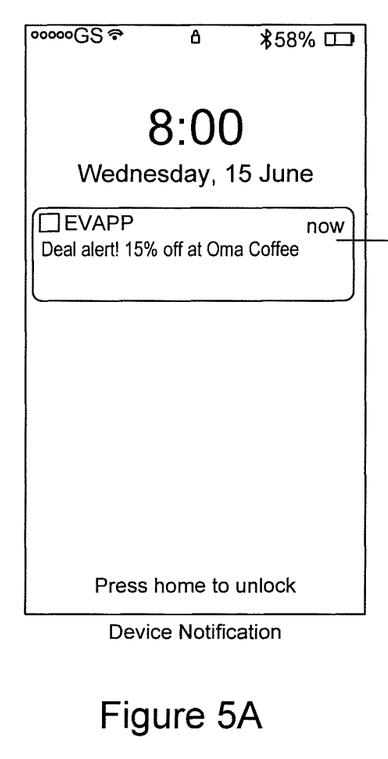
FIGS. 5A-5C represent exemplary interactive interfaces, according to an embodiment of the present invention.
Figure 5B:
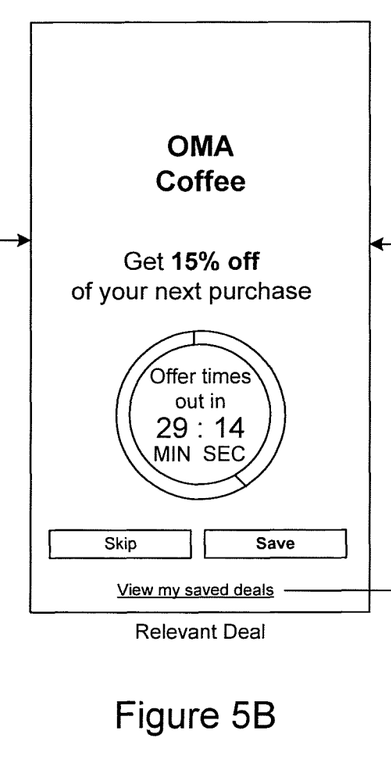
Figure 5C:
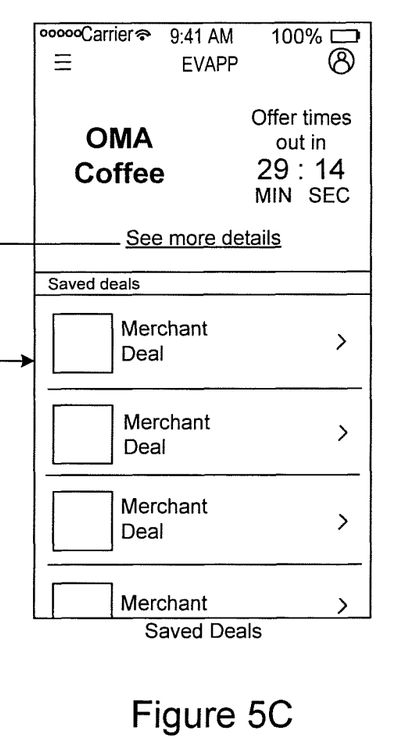

FIGS. 5A-5C represent exemplary interactive interfaces, according to an embodiment of the present invention. FIG. 5A represents an exemplary deal notification. The deal notification may be responsive to the customer's recent or current transaction at a local merchant. FIG. 5B represents an exemplary deal. The deal may be for a nearby coffee shop. In this example, the deal includes 15% off the customer's next purchase. In this example, the deal may be set to expire in 30 minutes. Other timing restrictions may be applied, e.g., at the end of the day, before/after an event, etc. In this example, the customer may Skip or Save the deal. Other actions may be supported. For example, the customer may select actions that convey the customer's interest in more deals like this one, remove these types of deals and/or other form of feedback. The customer may also request additional information, e.g., where can I redeem this?, what is the most popular coffee drink today?, what are the holiday specials? By selecting "View my saved deals," the customer may view a screen, represented by FIG. 5C. Here, the customer may view previously saved deals. The deals may be categorized by merchant, expiration time, relevancy, location, etc.

Figure 6A:
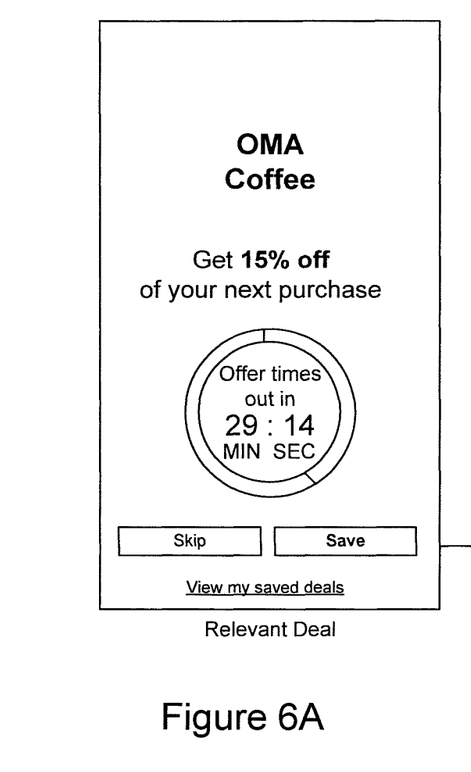
FIGS. 6A-6C represent exemplary interactive interfaces, according to an embodiment of the present invention.
Figure 6B:
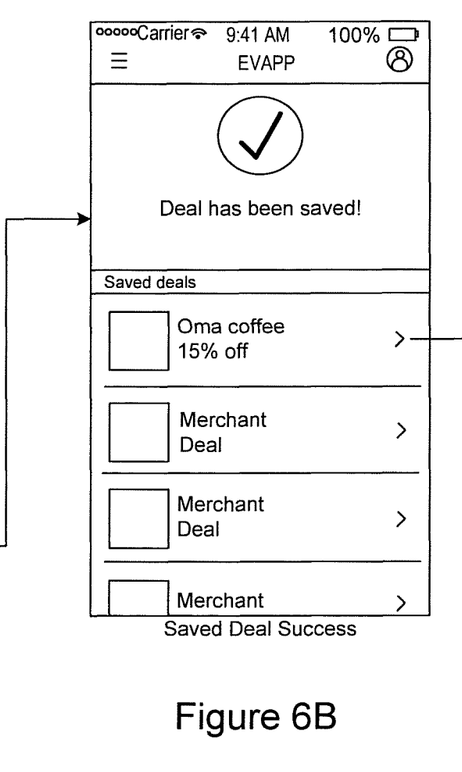
Figure 6C:
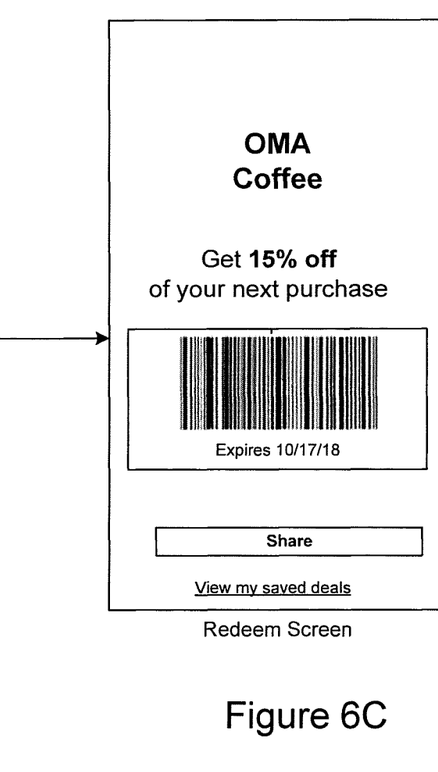

FIGS. 6A-6C represent exemplary interactive interfaces, according to an embodiment of the present invention. FIG.

6A is an exemplary deal relevant to the customer. The customer may "Save" this deal. FIG. 6B is an exemplary screen that confirms that the deal has been saved. When the customer is ready to redeem the deal, the customer may select the deal from this screen. FIG. 6C is an exemplary deal that may be shown to the merchant for redemption.

Figure 7A:
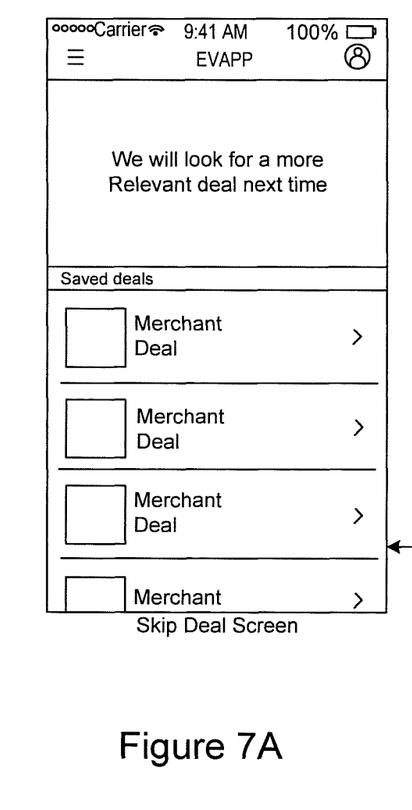
FIGS. 7A-7C represent exemplary interactive interfaces, according to an embodiment of the present invention.
Figure 7B:
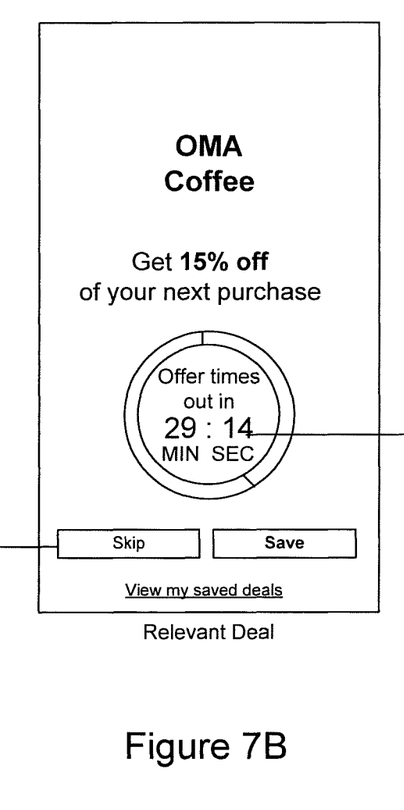
Figure 7C:
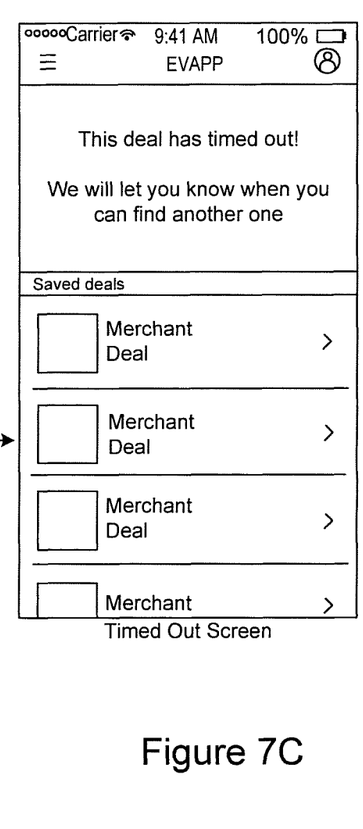

FIGS. 7A-7C represent exemplary interactive interfaces, according to an embodiment of the present invention. According to an embodiment of the present invention, customers may skip or miss a deal. These actions may be used as feedback into the machine learning algorithm. This information may be used to generate more relevant deals in the future. FIG. 7B represents an exemplary current deal. When the customer selects "Skip," a skip deal screen may be displayed, represented by FIG. 7A. When the deal expires, a timed out screen may be displayed as represented by FIG. 7C.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for generating relevant deals, the system comprising:
    a memory component; and
    a recommendation engine, comprising a computer processor, the recommendation engine coupled to the memory component and configured to:
    receive a request to initiate an electronic transaction from each of a plurality of mobile devices, wherein each of the plurality of mobile devices is associated with a customer;
    feed the requests for the electronic transactions into a machine learning server that applies a similarity matrix to identify similarities between metrics associated with the electronic transactions and a clustering algorithm to identity customer profiles;
    determine a location of each of the plurality of mobile devices that initiated electronic transactions;
    identify one or more merchants within a predetermined distance from the determined location of each of the plurality of mobile devices;
    process customer feedback on previous offers from social media;
    identify one or more electronic offers for the identified one or more merchants based on one or more characteristics associated with the customers of the mobile devices that initiated the electronic transactions from the customer profiles, customer feedback, and based on a threshold of a number of customers using the plurality of mobile devices within the predetermined distance;
    determine whether the number of customers is less than or equal to the threshold and if so, then the one or more electronic offers are based on the one or more customer characteristics;
    determine whether the number of customers exceeds the threshold and if so, clustering the number of customers into clusters, identifying a first customer at a center of each cluster and identifying one or more customer characteristics of the first customer and then identifying and ranking the one or more electronic offers based on the one or more characteristics of the first customer, the one or more customer characteristics of the first customer comprising one or more of prior purchasing behavior, age, gender, income data, and demographic data;
    transmit the one or more electronic offers to each of the plurality of mobile devices that initiated the electronic transactions, the one or more electronic offers comprising a time expiration to claim the offer; and
    receive a customer action responsive to the received one or more electronic offers.

2. The system of claim 1, wherein the time expiration to claim the offer is dependent on the corresponding electronic offer.

3. The system of claim 1, wherein the time expiration to claim the offer is less than one hour.

4. The system of claim 1, wherein the customer action comprises a save action and a skip action.

5. The system of claim 4, wherein the save action saves the corresponding electronic offer for redemption by the customer.

6. The system of claim 4, wherein the skip action removes the corresponding electronic offer.

7. The system of claim 1, wherein the one or more electronic offers are further determined based on applying a similarity matrix and a clustering algorithm to merchant data to identify a plurality of merchant clusters.

8. A method for providing an electronic offer in a mobile banking application implemented by one or more banking application server devices, the method comprising:
    receiving, via a mobile application executing on a mobile device, a request to initiate an electronic transaction from each of a plurality of mobile devices, wherein each of the plurality of mobile devices is associated with a customer;
    determining, via a computer processor, a location of each of the plurality of mobile devices that initiated electronic transactions;
    processing the requests for the electronic transactions by a machine learning server that applies a similarity matrix to identify similarities of metrics associated with the electronic transactions and a clustering algorithm to identify customer profiles;
    processing customer feedback on previous offers from social media;
    identifying, via a recommendation engine, one or more merchants within a predetermined distance from the determined location of each of the plurality of mobile devices;
    identifying, via the recommendation engine, one or more electronic offers for the identified one or more merchants based on one or more characteristics associated with the customers of the mobile devices that initiated the electronic transactions based on the customer profiles, customer feedback, and based on a threshold of a number of customers using the plurality of mobile devices within the predetermined distance, such that upon the number of customers being less than or equal to the threshold then basing the one or more electronic offers on the one or more customer characteristics and, upon the number of customers exceeding the threshold, clustering the number of customers into clusters, identifying a first customer at a center of each cluster, and identifying one or more characteristics of the first customer and then identifying and ranking the one or more electronic offers based on the one or more characteristics of the first customer, the one or more customer characteristics of the first customer comprising one or more of prior purchasing behavior, age, gender, income data, and demographic data;
    transmitting, via an electronic communication network, the one or more electronic offers to each of the plurality of mobile devices that initiated the electronic transactions, the one or more electronic offers comprising comprises a time expiration to claim the offer; and
    receiving a customer action responsive to the received one or more electronic offers.

9. The method of claim 8, wherein the time expiration to claim the offer is dependent on the corresponding electronic offer.

10. The method of claim 8, wherein the time expiration to claim the offer is less than one hour.

11. The method of claim 8, wherein the customer action comprises a save action and a skip action.

12. The method of claim 11, wherein the save action saves the corresponding electronic offer for redemption by the customer.

13. The method of claim 11, wherein the skip action removes the corresponding electronic offer.

14. The method of claim 8, wherein the one or more electronic offers are further determined based on applying a similarity matrix and a clustering algorithm to merchant data to identify a plurality of merchant clusters.

15. A non-transitory machine readable medium having stored thereon instructions for comprising executable code which when executed by one or more processors, causes the one or more processors to:
   receive a request to initiate an electronic transaction from each of a plurality of mobile devices, wherein each of the plurality of mobile devices is associated with a customer;
   determine a location of each of the plurality of mobile devices that initiated electronic transactions;
   transmit the requests for the electronic transactions to a machine learning server that applies a similarity matrix to identify similarities of metrics associated with the electronic transactions and a clustering algorithm to identify customer profiles;
   process customer feedback on previous offers from social media;
   identify one or more merchants within a predetermined distance from the determined location of each of the plurality of mobile devices;
   identify one or more electronic offers for the identified one or more merchants based on one or more characteristics associated with the customers of the mobile devices that initiated the electronic transactions based on the customer profiles, customer feedback, and based on a threshold of a number of customers using the plurality of mobile devices within the predetermined distance;
   determine whether the number of customers is less than or equal to the threshold and, if so, basing the one or more electronic offers on the one or more customer characteristics;
   determine whether the number of customers exceeds the threshold and if so, clustering the number of customers into clusters, identifying a first customer at a center of each cluster, and identifying one or more characteristics of the first customer and then identifying and ranking the one or more electronic offers based on the one or more characteristics of the first customer, the one or more customer characteristics of the first customer comprising one or more of prior purchasing behavior, age, gender, income data, and demographic data;
   transmit the one or more electronic offers to each of the plurality of mobile devices that initiated the electronic transactions, the one or more electronic offers comprising a time expiration to claim the offer; and
   receive a customer action responsive to the received one or more electronic offers.

* * * * *